United States Patent Office 3,040,083
Patented June 19, 1962

1

3,040,083
4-SUBSTITUTED-1,1,2-TRICYANO-1,3-BUTADIENE AND PROCESS OF PREPARATION
Douglas W. Wiley, Wilmington, Del., assignor to E. I. du Pont de Nemours and Company, Wilmington, Del., a corporation of Delaware
No Drawing. Filed Apr. 25, 1960, Ser. No. 24,242
22 Claims. (Cl. 260—465)

The present invention is concerned with a new process for preparation of 4-substituted-1,1,2-tricyano-1,3-butadienes and more particularly with selected 4-substituted-1,1,2-tricyano-1,3-butadienes which constitute new classes of colored organic chemical compounds useful as dye intermediates or dyes.

With the continued discovery of new synthetic fibers and the expanding use of these materials in clothing fabrics where colors and designs are of prime importance, there is an ever increasing need for new dyes with new chromophoric structures and with chemical characteristics which adapt them to new uses. By the same token, new intermediates for preparing some of the recently developed dyes are of importance in establishing the most economical route to these dyes. A facile method for preparing such dyes and dye intermediates thus would be of great utility and value.

It is an object of this invention to provide a new process for preparing 4-substituted-1,1,2-tricyano-1,3-butadienes. A further object is to provide a new process for preparing colored organic chemical compounds useful as dye intermediates or dyes. A still further object is to provide new classes of colored organic chemical compounds useful as dye intermediates or dyes. Another object is to provide new selected 4-substituted-1,1,2-tricyano-1,3-butadienes. Other objects will appear hereinafter.

These and other objects of this invention are accomplished by the novel process for preparing a 4-substituted-1,1,2-tricyano-1,3-butadiene which comprises contacting and reacting tricyanovinyl chloride with an ethylenic compound having the formula $$A-\underset{R^1}{C}=\underset{R^2}{C}-H$$

where $R^1$ and $R^2$ are hydrogen or hydrocarbyl groups free of aliphatic carbon-to-carbon unsaturation, and A is a hydrocarbyloxy group free of aliphatic carbon-to-carbon unsaturation, a hydrocarbyloxyaryl group free of aliphatic carbon-to-carbon unsaturation, an aryl group, a hydrocarbylaryl group free of aliphatic carbon-to-carbon unsaturation, or an amido group free of aliphatic carbon-to-carbon unsaturation. The 4-substituted-1,1,2-tricyano-1,3-butadienes prepared by the process of this invention have the formula $$A-\underset{R^1}{C}=\underset{R^2}{C}-\underset{CN}{C}=\underset{CN}{C}-CN$$

where $R^1$, $R^2$ and A are defined as aforesaid.

This invention also includes the new classes of 4-substituted-1,1,2-tricyano-1,3-butadienes having the formula $$B-\underset{R^1}{C}=\underset{R^2}{C}-\underset{CN}{C}=\underset{CN}{C}-CN$$

where $R^1$ and $R^2$ are hydrogen or hydrocarbyl groups free of aliphatic carbon-to-carbon unsaturation, and B is hydrocarbyloxy free of aliphatic carbon-to-carbon unsaturation, or aryl or hydrocarbylaryl free of aliphatic carbon-to-carbon unsaturation.

A preferred new class of 4-substituted-1,1,2-tricyano-

2

1,3-butadienes of this invention are the 4-hydrocarbyloxy-1,1,2-tricyano-1,3-butadienes having the formula $$R-O-\underset{R^1}{C}=\underset{R^2}{C}-\underset{CN}{C}=\underset{CN}{C}-CN$$

where R is a hydrocarbyl group free of aliphatic carbon-to-carbon unsaturation and $R^1$ and $R^2$ are hydrogen or hydrocarbyl groups free of aliphatic carbon-to-carbon unsaturation.

This new class of 4-hydrocarbyloxy-1,1,2-tricyano-1,3-butadienes can be prepared by the process of this invention which comprises contacting and reacting tricyanovinyl chloride with a 1-hydrocarbyloxy-2-hydrogenethylene having the formula $$R-O-\underset{R^1}{C}=\underset{R^2}{C}-H$$

where R is a hydrocarbyl group free of aliphatic carbon-to-carbon unsaturation and $R^1$ and $R^2$ are hydrogen or hydrocarbyl groups free of aliphatic carbon-to-carbon unsaturation.

The new class of 4-aryl- and 4-hydrocarbylaryl-1,1,2-tricyano-1,3-butadienes can be prepared by the process of this invention which comprises contacting and reacting tricyanovinyl chloride with a 1-aryl-2-hydrogenethylene or a 1-hydrocarbylaryl-2-hydrogenethylene having the formula $$R^3-Ar-\underset{R^1}{C}=\underset{R^2}{C}-H$$

where Ar is arylene and $R^1$, $R^2$ and $R^3$ are hydrogen or hydrocarbyl groups free of aliphatic carbon-to-carbon unsaturation. The new 4-aryl-1,1,2-tricyano-1,3-butadienes and new 4-hydrocarbylaryl-1,1,2-tricyano-1,3-butadienes can be represented by the formula $$R^3-Ar-\underset{R^1}{C}=\underset{R^2}{C}-\underset{CN}{C}=\underset{CN}{C}-CN$$

where Ar is arylene, and $R^1$, $R^2$ and $R^3$ are hydrogen or hydrocarbyl groups free of aliphatic carbon-to-carbon unsaturation.

By arylene is meant generically any divalent aromatic radical. It is of the essence of an arylene radical that the two bonds stem from different ring carbon atoms. Among arylene radicals are included those from which the corresponding aromatic compound obtained by placing hydrogens at the respective bonds of the arylene group, i.e., the parent compound whose valences are all satisfied, has a resonance energy of not less than 20 kcal./mole. Resonance energies of organic compounds and the determination of resonance energies are shown by Linus Pauling in "The Nature of the Chemical Bond," Second Edition, Cornell University Press, 1945, pages 132–139.

Arylene groups particularly suitable in the compounds of this invention are those containing 20 or fewer carbon atoms and include the hydrocarbon arylenes, particularly phenylene, naphthylene, and anthrylene. By aryl is means any arylene group as above in which one of the two bonds is satisfied by hydrogen.

The novel process of the invention and the products prepared thereby can be illustrated by the following equation:

$$\underset{A\ H}{\underset{R^1\ R^2}{C}}=\underset{Cl\ CN}{\underset{CN\ CN}{C}}+\underset{}{C}=\underset{}{C} \longrightarrow A-\underset{R^1}{C}=\underset{R^2}{C}-\underset{CN}{C}=\underset{CN}{C}+HCl$$

where A, $R^1$ and $R^2$ are as heretofore defined.

The process of this invention can be carried out simply by bringing tricyanovinyl chloride and a 1-substituted-2-hydrogen ethylene into intimate contact at room temperature and ordinary atmospheric pressure. No added ingredients, catalysts, or special conditions are essential. However, under these conditions the formation of a 4-substituted-1,1,2-tricyano-1,3-butadiene may be slow. For best yields of product in a minimum time, it is expedient to carry out the reaction at temperatures above room temperature. Temperatures within the range of 20–200° C. are usually employed.

It is convenient, though not essential, to carry out the reaction of this invention in a liquid medium which is inert to the reactants and the resulting product. This practice provides a means for dissipating the heat of reaction. Operating at the reflux temperature of the medium is a convenient means of providing a preferred elevated temperature for carrying out the process. Suitable inert media include tetra hydrofuran, diethyl ether, ethylene glycol dimethyl ether, acetonitrile, and benzene.

Since hydrogen chloride is a by-product of the reaction of this invention, it is convenient, though not essential, to carry out the process in the presence of an acid-absorbing material, such as a suitable alkaline substance. The acid-absorbing material may at the same time serve as the reaction medium. Suitable acid absorbers include sodium fluoride, dimethylformamide, and tri-n-butylamine.

Pressure is not a critical factor in the process of this invention. Atmospheric pressure is therefore preferred though pressures above and below atmospheric pressure are operable.

Tricyanovinyl chloride for use in this invention can be prepared by chlorination of tricyanoethylene followed by dehydrochlorination of the resulting 1,2-dichloro-1,1,2-tricyanoethane in the presence of an acid acceptor, such as a tertiary amine. Tricyanovinyl chloride and its preparation are disclosed and claimed in the copending patent application of Dickinson, Ser. No. 753,424, filed August 6, 1958 now U.S. Patent 2,942,022, issued June 21, 1960.

The amido group A in the 1-amido-2-hydrogen ethylene reactant and in the 4-amido-1,1,2-tricyano-1,3-butadiene products obtained can be any amido group free of aliphatic carbon-to-carbon unsaturation and includes amido groups having the formula

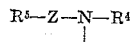

where Z is the carbonyl,

group or the sulfonyl,

group, $R^4$ is a hydrocarbyl group free of aliphatic carbon-to-carbon unsaturation, and when Z is the sulfonyl group, $R^5$ is a hydrocarbyl group free of aliphatic carbon-to-carbon unsaturation, and when Z is the carbonyl group, $R^5$ is hydrogen or a hydrocarbyl group free of aliphatic carbon-to-carbon unsaturation.

The specific hydrocarbyl groups represented by the several R's in all of the formulas herein set forth can be alike or different.

The hydrocarbyl groups represented by R, $R^1$, $R^2$, $R^3$, $R^4$ and $R^5$ in the starting materials and products indicated above can be any radical composed solely of carbon and hydrogen and being free of aliphatic carbon-to-carbon unsaturation. "Hydrocarbyl" is used in its full generic sense. The term "hydrocarbyl" is consistent with chemical nomenclature and is synonymous with the term "hydrocarbon radical." The wide variation in the hydrocarbyl groups used in the illustrations which follow makes it evident that all hydrocarbyl groups free of aliphatic carbon-to-carbon unsaturation are operable. Hydrocarbyl groups free of aliphatic carbon-to-carbon unsaturation include alkyl, cycloalkyl, aryl, aralkyl, alkaryl, single ring, multi ring, straight chain, branched chain, large, small, and the like.

All aliphatically saturated hydrocarbyl radicals in the 1-substituted-2-hydrogenethylenes pass through the process of this invention and appear unchanged in the product. The widest variation in these hydrocarbyl radicals free from aliphatic carbon-to-carbon unsaturation does not prevent the formation in this process of the products of this invention.

The limitations of space for disclosure are not to be construed as any limitation of the scope of "hydrocarbyl" contemplated in this invention. Even the most cumbersome saturated hydrocarbyl radicals such as those obtained by removing end groups from high molecular weight hydrocarbon polymer molecules containing thousands of carbon atoms, such as polyethylene, polyisobutylene, polystyrene, and the like, are fully operable.

It is obvious that aliphatically saturated hydrocarbyl groups containing 20 or fewer carbon atoms are most available, and to that extent preferred. But there is to be no question of the operability of, or of the intent to include and disclose, any hydrocarbyl group whatsoever, as long as it is free of aliphatic carbon-to-carbon unsaturation. Wide variations in size and structure of these hydrocarbyl radicals do not affect the ability of the butadienes to which they are attached to be used as dyes or as dye intermediates.

In the following examples parts are by weight except where otherwise indicated. Example III represents a preferred embodiment of the invention. Examples I–III illustrate the novel process of this invention for preparing the new 4-hydrocarbyloxy-1,1,2-tricyano-1,3-butadienes.

EXAMPLE I

To a solution of 274 parts of freshly sublimed tricyanovinyl chloride in 444 parts of tetrahydrofuran is added 268 parts of benzyl vinyl ether dissolved in 444 parts of tetrahydrofuran. The yellow solution warms spontaneously to 44° C. within five minutes, is heated to reflux for ten minutes, and then allowed to cool to room temperature. The vapors above the deep red solution are acidic. Petroleum ether, B.P. 30–60° C., is added until the solution is just cloudy. Chilling to 0° C. gives 100 parts of crude 4-benzyloxy-1,1,2-tricyano-1,3-butadiene as dark crystals. Extraction of the crude material with 100 volumes of refluxing cyclohexane followed by cooling gives fluffy orange-yellow platelets, M.P. 100–103° C.

EXAMPLE II

To a solution of 685 parts of tricyanovinyl chloride in 1784 parts of diethyl ether, 670 parts of benzyl ether in 1427 parts of diethyl ether is added with stirring under an atmosphere of nitrogen. An exothermic reaction occurs. After three hours, 444 parts of tetrahydrofuran is added and the solution is allowed to stand at room temperature for 16 hours. A dark precipitate, weighing 530 parts, is separated from the solution by filtration. The solution fumes with hydrogen chloride which is formed in the reaction. The precipitate is washed two times through a column of acidic activated aluminum oxide, using benzene as a wash liquid. Evaporation of the benzene yields 4-benzyloxy-1,1,2-tricyano-1,3-butadiene as a bright yellow solid, melting at 102–105° C. After three recrystallizations from warm ethyl acetate, a purified product, melting at 106.5–107.5° C., is obtained. The ultraviolet absorption spectrum of a methylene chloride solution of this product shows a maximum at 357 millimicrons with a molecular extinction coefficient of 31,000. The infrared absorption spectrum shows peaks at 2225 cm.$^{-1}$ (conjugated C≡N) and at 1620 and 1525 cm.$^{-1}$.

*Analysis.*—Calcd. for $C_{14}H_9N_3O$: C, 71.5; H, 3.9; N, 17.9. Found: C, 71.8, 72.1; H, 4.0, 4.0. N(D), 18.0, 18.3; (K), 18.1, 17.8.

EXAMPLE III

A solution of 137 parts of tricyanovinyl chloride in 444 parts of tetrahydrofuran is stirred under an atmosphere supplying an excess of methyl vinyl ether. The temperature rises to 51° C. during the first 20 minutes. After 40 minutes, the solution has cooled again and is concentrated by evaporation, the solution fuming with hydrogen chloride vapors. The product is a dark crystalline mass which is taken up in benzene and passed over a short column of acidic activated aluminum oxide. The first 22,000 parts of benzene is collected and concentrated by evaporation to yield 84 parts of a yellow solid, melting at 98–101° C. This product is recrystallized from carbon tetrachloride to yield brown needles, melting at 100.5–102° C. The product is rechromatographed in benzene over acidic activated aluminum oxide as above to yield 30 parts of 4-methoxy-1,1,2-tricyano-1,3-butadiene in the form of bright yellow needles, melting at 101–103° C. The ultraviolet absorption spectrum of a methylene chloride solution of this product shows a maximum at 352 millimicrons with a molecular extinction coefficient of 27,000. The infrared absorption spectrum shows peaks at 2235 cm.$^{-1}$ (conjugated C≡N) and at 1603, 1613, and 1526 cm.$^{-1}$.

*Analysis.*—Calcd. for $C_8H_5N_3O$: C, 60.4; H, 3.2; N, 26.4. Found: C, 60.2, 60.4; H, 3.0, 3.4. N(K), 26.9, 27.2; (D), 26.6.

When the hydrocarbyloxy ethylenes shown in the following table are substituted for methyl vinyl ether in the procedure of Example III, the reaction with tricyanovinyl chloride will yield, respectively, the indicated products:

Table I

| 1-Hydrocarbyloxy-2-hydrogenethylene | Product Obtained by Reaction with Tricyanovinyl Chloride |
|---|---|
| ethyl vinyl ether | 4-ethoxy-1,1,2-tricyano-1,3,butadiene. |
| isobutyl vinyl ether | 4-isobutoxy-1,1,2-tricyano-1,3-butadiene. |
| 2-ethylhexyl vinyl ether. | 4-(2-ethylhexyloxy)-1,1,2-tricyano-1,3-butadine. |
| n-amyl vinyl ether | 4-amyloxy-1,1,2-tricyano-1,3-butadiene. |
| isoamyl vinyl ether | 4-isoamyloxy-1,1,2-tricyano-1,3-butadiene. |
| 1,2,2-trimethylpropyl vinyl ether. | 1,1,2-tricyano-4-(1,2,2-trimethylpropoxy)-1,3-butadiene. |
| n-hexyl vinyl ether | 4-hexyloxy-1,1,2-tricyano-1,3-butadiene. |
| 2-ethylbutyl vinyl ether. | 4-(2-ethylbutoxy)-1,1,2-tricyano-1,3-butadiene. |
| 1,3-dimethylbutyl vinyl ether. | 4-(1,3-dimethylbutoxy)-1,1,2-tricyano-1,3-butadiene. |
| 2,4-dimethyl-3-pentyl vinyl ether. | 4-(2,4-dimethyl-3-pentoxy)-1,1,2-tricyano-1,3-butadiene. |
| n-octyl vinyl ether | 4-octyloxy-1,1,2-tricyano-1,3-butadiene. |
| 1-methylheptyl vinyl ether. | 4-(1-methylheptyloxy)-1,1,2-tricyano-1,3-butadiene. |
| nonyl vinyl ether | 4-nonyloxy-1,1,2-tricyano-1,3-butadiene. |
| n-decyl vinyl ether | 4-decyloxy-1,1,2-tricyano-1,3-butadiene. |
| 1-methyl-4-ethyloctyl vinyl ether. | 4-(1-methyl-4-ethyloctyloxy)-1,1,2-tricyano-1,3-butadiene. |
| n-tetradecyl vinyl ether. | 4-tetradecyloxy-1,1,2-tricyano-1,3-butadiene. |
| n-hexadecyl vinyl ether. | 4-hexadecyloxy-1,1,2-tricyanol-3-butadiene. |
| n-octadecyl vinyl ether. | 4-octadecyloxy-1,1,2-tricyano-1,3-butadiene. |
| phenyl vinyl ether | 4-phenoxy-1,1,2-tricyano-1,3-butadiene. |
| alpha-naphtha vinyl ether. | 4-(alpha-naphthyloxy)-1,1,2-tricyano-1,3-butadiene. |
| beta-naphthyl vinyl ether. | 4-(beta-naphthyloxy)-1,1,2-tricyano-1,3-butadiene. |
| isopropenyl methyl ether. | 4-methoxy-4-methyl-1,1,2-tricyano-1,3-butadiene. |
| isopropenyl ethyl ether. | 4-ethoxy-4-methyl-1,1,2-tricyano-1,3-butadiene. |
| alpha-ethylvinyl ethyl ether. | 4-ethoxy-4-ethyl-1,1,2-tricyano-1,3-butadiene. |
| alpha-amylvinyl methyl ether. | 4-amyl-4-methoxy-1,1,2-tricyano-1,3-butadiene. |
| cyclohexyl vinyl ether. | 4-cyclohexyloxy-1.1.2-tricyano-1,3-butadiene. |
| decahydronaphthyl vinyl ether. | 4-decahydronaphthyloxy-1,1,2-tricyano-1,3-butadiene. |
| alpha-phenylethyl vinyl ether. | 4-(alpha-phenylethoxy)-1,1,2-tricyano-1,3-butadiene. |
| beta-phenylethyl vinyl ether. | 4-(beta-phenylethoxy)-1,1,2-tricyano-1,3-butadiene. |
| beta-phenylpropyl vinyl ether. | 4-(beta-phenylpropoxy)-1,1,2-tricyano-1,3-butadiene. |
| alpha-cyclohexylethyl vinyl ether. | 4-(alpha-cyclohexylethoxy)-1,1,2-tricyano-1,3-butadiene. |
| alpha-methylvinyl phenyl ether. | 4-methyl-4-phenoxy-1,1,2-tricyano-1,3-butadiene. |
| alpha-phenylvinyl phenyl ether. | 4-phenoxy-4-phenyl-1,1,2-tricyano-1,3-butadiene. |
| beta-phenylvinyl phenyl ether. | 4-phenoxy-3-phenyl-1,1,2-tricyano-1,3-butadiene. |

Table I—Continued

| 1-Hydrocarbyloxy-2-hydrogenethylene | Product Obtained by Reaction with Tricyanovinyl Chloride |
|---|---|
| 0-ethylphenyl vinyl ether. | 4-(o-ethylphenoxy)-1,1,2-tricyano-1,3-butadiene. |
| 2-methoxy-2-butene | 3,4-dimethyl-4-methoxy-1,1,2-tricyano-1,3-butadiene. |
| 2-ethoxy-1-butene | 4-ethoxy-4-ethyl-1,1,2-tricyano-1,3-butadiene. |
| alpha-methoxystyrene | 4-methoxy-4-phenyl-1,1,2-tricyano-1,3-butadiene. |
| alpha-ethoxystyrene | 4-ethoxy-4-phenyl-1,1,2-tricyano-1,3-butadiene. |
| alpha-propoxystyrene | 4-phenyl-4-propoxy-1,1,2-tricyano-1,3-butadiene. |

All hydrocarbyloxy butadienes of this invention obtainable by variation of hydrocarbyl groups within the herein stated definitions are hereby disclosed.

Example IV illustrates the novel process of this invention for preparing new 4-aryl-1,1,2-tricyano-1,3-butadienes.

EXAMPLE IV

A solution of 275 parts of tricyanovinyl chloride and 416 parts of styrene in 622 parts of tetrahydrofuran is refluxed for two days. The volatile solvents are stripped off in vacuo and the black residue chromatographed on 15,000 parts of acidic activated alumina using benzene as eluant. A total of 17,600 parts of bright yellow benzene solution is collected and concentrated to give 24 parts of yellow solid, M.P. 135–204° C. This material is rechromatographed and then recrystallized three times from dichloroethane to give a product with melting point of 199–205° C. (with dec.). The ultraviolet spectrum in methylene chloride contains a major absorption at 402 millimicrons with molecular extinction coefficient of 32,800. When ethanol is used as a solvent, the band is at 390 millimicrons with molecular extinction coefficient of 28,500. The infrared spectrum contains absorption peaks characteristic of aromatic CH (3035 cm.$^{-1}$), unsaturated CH (3015 cm.$^{-1}$), conjugated CN (2207 cm.$^{-1}$), aromatic and conjugated C=C (1599, 1559, and 1510 cm.$^{-1}$), trans CH=CH (968 cm.$^{-1}$) and monosubstituted benzenes (759 and 685 cm.$^{-1}$). The product is sublimed at 120° C. at 0.1 mm. to give 4-phenyl-1,1,2-tricyano-1,3-butadiene in the form of orange prisms, M.P. 202–205° C. (dec.).

*Analysis.*—Calcd. for $C_{13}H_7N_3$: C, 76.1; H, 3.4; N, 20.5. Found: C, 75.6, 75.2; H, 3.6, 3.4; N, 20.6, 20.7.

The same tricyanobutadiene is also obtained by refluxing a solution of tricyanovinyl chloride and styrene in 1,2-dimethoxy ethylene with sodium fluoride for 21 hours.

Examples V and VI illustrate the novel process of this invention for preparing the 4-hydrocarbyloxyaryl-1,1,2-tricyano-1,3-butadienes disclosed and claimed in the patent application of J. K. Williams filed concurrently herewith, Serial No. 24,243.

EXAMPLE V

A mixture of 274 parts of tricyanovinyl chloride and 268 parts of p-methoxystyrene is dissolved in 7104 parts of tetrahydrofuran to give a deep red solution. The temperature rises slowly to 40° C. and then cools back to room temperature accompanied by HCl evolution and deposition of crystals. After standing three hours, the mixture is chilled and filtered to give 180 parts of 4-(p-methoxyphenyl)-1,1,2-tricyano-1,3-butadiene, M.P. 214.5–215° C.

Additional product is obtained by adding 268 parts of p-methoxystyrene to the above filtrate. After standing overnight, 98 parts of large red prisms, M.P. 210–212° C., are obtained giving a total yield of 278 parts or 60% of theory.

EXAMPLE VI

To a solution of 274 parts of tricyanovinyl chloride in 888 parts of tetrahydrofuran, 296 parts of anethole is added with agitation. The dark red solution is allowed to stand overnight at room temperature. The solvent is stripped off in vacuo and the residue chromatographed in a column using 15,000 parts of acidic activated alumina constructed in benzene. The column is developed with 26,400–35,200 parts of benzene. The following fractions are obtained by eluting with benzene and ether:

(1) 13,200 parts of benzene-yellow solution yielding on evaporation an orange oil
(2) 22,000 parts of benzene-yellow solution yielding on evaporation 59 parts of a gummy, red solid
(3) 17,600 parts of benzene-bright yellow solution yielding on evaporation 26 parts of a red solid
(4) 19,700 parts of benzene-ether yielding on evaporation 187 parts of a red solid
(5) 17,900 parts of ether yielding on evaporation 37 parts of a red solid
(6) 17,900 parts of ether yielding on evaporation 9 parts of solid residue
(7) 28,700 parts of ether and 10% acetone-ether yielding on evaporation 29 parts of a gummy, red solid.

Fractions 3 through 6 are combined and recrystallized from methanol to give 179 parts of maroon crystals, M.P. 137.5–139.0° C. An additional 35 parts of maroon crystals are obtained from fractions 2 and 7 to give a total yield 214 parts (43% of theory) of 4-(p-methoxyphenyl)-3-methyl-1,1,2-tricyano-1,3-butadiene. After four recrystallizations from methanol followed by drying at 80° C. for three hours under vacuum, the product melts at 138–139° C. The ultraviolet absorption spectrum (in EtOH) contains absorption peaks at 260 millimicrons (molecular extinction coefficient 11,300) and 444 millimicrons (molecular extinction coefficient 16,600). The infrared spectrum (in KBr) contains the following major absorption peaks: 4.51 (C≡N), 6.24, 6.35, 6.42, 6.61, 6.74, 7.00, 7.26, 7.51, 7.80, 7.92, 8.12, 8.46, 8.87, 9.35, 9.82, 10.28, 10.98, 11.83, 11.92, 13.0, 14.4 microns.

When the substituted ethylenes shown in the following table are used in place of p-methoxystyrene in the procedure of Example V, the reaction with tricyanovinyl chloride will yield, respectively, the indicated products:

*Table II*

| 1-Aryl- or 1-Substituted aryl-2-hydrogenethylene | Butadiene Formed on Reaction with Tricyanovinyl Chloride |
| --- | --- |
| o-methoxystyrene | 4-(o-methoxyphenyl)-1,1,2-tricyano-1,3-butadiene. |
| p-ethoxystyrene | 4-(p-ethoxyphenyl)-1,1,2-tricyano-1,3-butadiene. |
| p-phenoxystyrene | 4-(p-phenoxyphenyl)-1,1,2-tricyano-1,3-butadiene. |
| p-methoxystilbene | 4-(p-methoxyphenyl)-3-phenyl-1,1,2-tricyano-1,3-butadiene. |
| alpha-methylstyrene | 4-methyl-4-phenyl-1,1,2-tricyano-1,3-butadiene. |
| p-heyptylstyrene | 4-(p-heptylphenyl)-1,1,2-tricyano-1,3-butadiene. |
| p-cyclohexylstyrene | 4-(p-cyclohexylphenyl)-1,1,2-tricyano-1,3-butadiene. |
| p-benzylstyrene | 4-(p-benzylphenyl)-1,1,2-tricyano-1,3-butadiene. |
| alpha-vinylnaphthalene | 4-(alpha-naphthyl)-1,1,2-tricyano-1,3-butadiene. |
| 1,1-diphenylethylene | 4,4-diphenyl-1,1,2-tricyano-1,3-butadiene. |
| o-vinylbiphenyl | 4-(o-phenylphenyl)-1,1,2-tricyano-1,3-butadiene. |
| 4-vinyl-1-terphenyl | 4-(p-[o-phenylphenyl]phenyl)-1,1,2-tricyano-1,3-butadiene. |
| 2-vinylfluorene | 4-(2-fluorenyl)-1,1,2-tricyano-1,3-butadiene. |
| 1-vinylacenaphthene | 4-(1-acenaphthenyl)-1,1,2-tricyano-1,3-butadiene. |
| 2-vinylphenanthrene | 4-(2-phenanthryl)-1,1,2-tricyano-1,3-butadiene. |

Examples VII and VIII illustrate the novel process of this invention for preparing the 4-amido-1,1,2-tricyano-1,3-butadienes disclosed and claimed in the patent application of J. K. Williams filed concurrently herewith, Serial No. 24,269.

EXAMPLE VII

A mixture of 137 parts of tricyanovinyl chloride, 111 parts of N-vinylpyrrolidone, 210 parts of sodium fluoride, and 873 parts of 1,2-dimethoxyethane is stirred overnight. The organic solution is then separated from the inorganic salts and concentrated to give a dark red gummy residue. Two recrystallizations from ethanol give 108 parts (51% of theory) of 4-(N-pyrrolidonyl)-1,1,2-tricyano-1,3-butadiene as yellow needles, M.P. 175–177° C.

EXAMPLE VIII

A mixture of 34 parts of tricyanovinyl chloride, 53 parts of N-methyl-N-vinyl-p-toluenesulfonamide, 100 parts sodium fluoride, and 262 parts of 1,2-dimethoxyethane is stirred overnight at room temperature. The inorganic salts are removed by filtration. After removal of the solvent in vacuo the dark organic residue is taken up in hot ethanol, filtered and chilled. The resulting yellow-orange needles weigh 49 parts (62% of theory). After four recrystallizations from benzene/cyclohexane (1:1), 4-(N-methyl-p-toluenesulfonamido)-1,1,2-tricyano-1,3-butadiene, M.P. 170–171° C., is obtained. The ultraviolet absorption spectrum of an acetonitrile solution shows a maximum at 388 millimicrons with a molecular extinction coefficient of 25,600.

*Analysis.*—Calcd. for $C_{15}H_{12}N_4O_2S$: S, 10.3. Found: S, 10.4, 10.2.

When the 1-amido-2-hydrogenethylenes shown in the following table are substituted for N-vinylpyrrolidone in the procedure of Example VII, the reaction with tricyanovinyl chloride will yield the indicated substituted butadiene products.

*Table III*

| 1-Amido-2-hydrogenethylene | Butadiene Formed on Reaction with Tricyanovinyl Chloride |
| --- | --- |
| N-methyl-N-vinyl-formamide. | 4-(N-methylformamido)-1,1,2-tricyano-1,3-butadiene. |
| N-methyl-N-vinyl-acetamide. | 4-(N-methylacetamido)-1,1,2-tricyano-1,3-butadiene. |
| N-ethyl-N-vinyl-acetamide. | 4-(N-ethylacetamido)-1,1,2-tricyano-1,3-butadiene. |
| N-cyclohexyl-N-vinyl-acetamide. | 4-(N-cyclohexylacetamido)-1,1,2-tricyano-1,3-butadiene. |
| N-phenyl-N-vinyl-acetamide. | 4-(N-phenylacetamido)-1,1,2-tricyano-1,3-butadiene. |
| N-tolyl-N-vinyl-acetamide. | 4-(N-tolylacetamido)-1,2,2-tricyano-1,3-butadiene. |
| N-methyl-N-vinyl-butyramide. | 4-(N-methylbutyramido)-1,1,2-tricyano-1,3-butadiene. |
| N-methyl-N-vinyl-capramide. | 4-(N-methylcapramido)-1,1,2-tricyano-1,3-butadiene. |
| N-methyl-N-styryl-acetamide. | 4-(N-methylacetamido)-3-phenyl-1,1,2-tricyano-1,3-butadiene. |
| N-methyl-N-(1,2-diphenylvinyl)-acetamide. | 4-(N-methylacetamido)-3,4-diphenyl-1,1,2-tricyano-1,3-butadiene. |
| N-methyl-N-styryl-benzamide. | 4-(N-methylbenzamido)-3-phenyl-1,1,2-tricyano-1,3-butadiene. |
| N-methyl-N-vinyl-benzamide. | 4-(N-methylbenzamido)-1,1,2-tricyano-1,3-butadiene. |

In addition to being colored compounds of themselves, the 4-hydrocarbyloxy-1,1,2-tricyano-1,3-butadienes of this invention are all useful as dye intermediates. For example, they all react readily with N,N-dimethylaniline to yield the corresponding 4-(p-N,N-dimethylaminophenyl)-1,1,2-tricyano-1,3-butadiene dyes. This may be shown generically by the following equation:

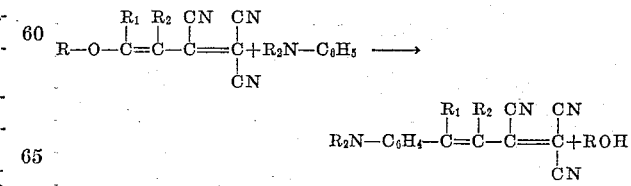

where the R's are as previously defined. This process is illustrated specifically in Example A which follows:

EXAMPLE A

A solution of 32 parts of 4-methoxy-1,1,2-tricyano-1,3-butadiene and 192 parts of N,N-dimethylaniline in 189 parts of dimethylformamide is heated for 1½ hours at 80–100° C. After standing overnight at room temperature the reaction mixture is drowned in about 5000 parts of 1N sulfuric acid. The precipitate of 4-(p-N,N-dimethylaminophenyl)-1,1,2-tricyano-1,3-butadiene which forms is collected by filtration and washed with water. It is recrystallized by extraction in xylene to yield a blue grey solid which in acetone solution shows an absorption maximum at 582 millimicrons, confirming its identity with the same compound as shown in Example I of U.S. Patent 2,798,881.

The 4-aryl-1,1,2-tricyano-1,3-butadienes and 4-hydrocarbylaryl-1,1,2-tricyano-1,3-butadienes of this invention are all colored compounds which are useful as dyes. They can be employed as dyes in the same manner as the 4-hydrocarbyloxyaryl-1,1,2-tricyano-1,3-butadienes and the 4-amido-1,1,2-tricyano-1,3-butadienes which are all colored compounds shown to be useful as dyes in the concurrently filed applications of J. K. Williams, Serial Nos. 24,243 and 24,269.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for preparing a 4-substituted 1,1,2-tricyano-1,3-butadiene having the formula

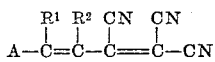

which comprises contacting and reacting tricyanovinyl chloride with an ethylenic compound having the formula

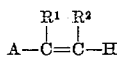

where $R^1$ and $R^2$ are selected from the group consisting of hydrogen and hydrocarbyl groups free of aliphatic carbon-to-carbon unsaturation, and A is selected from the group consisting of hydrocarbyloxy groups free of aliphatic carbon-to-carbon unsaturation, hydrocarbyloxyaryl groups free of aliphatic carbon-to-carbon unsaturation, aryl groups, hydrocarbylaryl groups free of aliphatic carbon-to-carbon unsaturation, the pyrrolidonyl radical and amido radicals of the formula

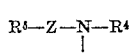

where $R^4$ is a hydrocarbyl group free of aliphatic carbon-to-carbon unsaturation, Z is selected from the group consisting of carbonyl and sulfonyl, and when Z is sulfonyl, $R^5$ is a hydrocarbyl group free of aliphatic carbon-to-carbon unsaturation, and when Z is carbonyl, $R^5$ is selected from the group consisting of hydrogen and hydrocarbyl groups free of aliphatic carbon-to-carbon unsaturation.

2. Process for preparing a 4-hydrocarbyloxy-1,1,2-tricyano-1,3-butadiene which comprises contacting and reacting tricyanovinyl chloride with a 1-hydrocarbyloxy-2-hydrogenethylene having the formula

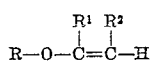

where R is a hydrocarbyl group free of aliphatic carbon-to-carbon unsaturation and $R^1$ and $R^2$ are hydrocarbyl groups free of aliphatic carbon-to-carbon unsaturation.

3. Process for preparing a 4-hydrocarbyloxy-1,1,2-tricyano-1,3-butadiene which comprises contacting and reacting tricyanovinyl chloride with a 1-hydrocarbyloxy-2-hydrogenethylene having the formula

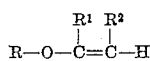

where R is a hydrocarbyl group free of aliphatic carbon-to-carbon unsaturation and one of the groups $R^1$ and $R^2$ is a hydrocarbyl group free of aliphatic carbon-to-carbon unsaturation and the other is hydrogen.

4. Process for preparing a 4-hydrocarbyloxy-1,1,2-tricyano-1,3-butadiene which comprises contacting and reacting tricyanovinyl chloride with a 1-hydrocarbyloxy-2-hydrogenethylene having the formula

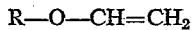

where R is a hydrocarbyl group free of aliphatic carbon-to-carbon unsaturation.

5. Process for preparing a 4-alkoxy-1,1,2-tricyano-1,3-butadiene which comprises contacting and reacting tricyanovinyl chloride with a 1-alkoxy-2-hydrogenethylene having the formula

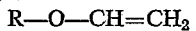

where R is alkyl.

6. Process for preparing a 4-aralkyloxy-1,1,2-tricyano-1,3-butadiene which comprises contacting and reacting tricyanovinyl chloride with a 1-aralkyloxy-2-hydrogenethylene having the formula

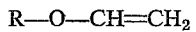

where R is aralkyl.

7. Process for preparing a 4-aryloxy-1,1,2-tricyano-1,3-butadiene which comprises contacting and reacting tricyanovinyl chloride with a 1-aryloxy-2-hydrogenethylene having the formula

where R is aryl.

8. Process for preparing 4-benzyloxy-1,1,2-tricyano-1,3-butadiene which comprises contacting and reacting tricyanovinyl chloride with benzyl vinyl ether.

9. Process for preparing 4-methoxy-1,1,2-tricyano-1,3-butadiene which comprises contacting and reacting at a temperature within the range of 20 to 200° C., tricyanovinyl chloride with methyl vinyl ether.

10. A 4-hydrocarbyloxy-1,1,2-tricyano-1,3-butadiene having the formula

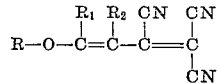

where R is a hydrocarbyl group free of aliphatic carbon-to-carbon unsaturation and $R^1$ and $R^2$ are selected from the group consisting of hydrogen and hydrocarbyl groups free of aliphatic carbon-to-carbon unsaturation.

11. A 4-hydrocarbyloxy-1,1,2-tricyano-1,3-butadience having the formula

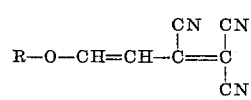

where R is a hydrocarbyl group free of aliphatic carbon-to-carbon unsaturation.

12. A 4-alkoxy-1,1,2-tricyano-1,3-butadiene having the formula

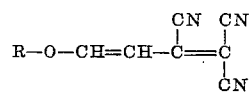

where R is alkyl.

13. A 4-aralkyloxy-1,1,2-tricyano-1,3-butadiene having the formula

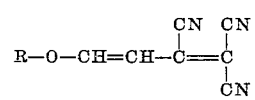

where R is aralkyl.

14. A 4-aryloxy-1,1,2-tricyano-1,3-butadiene having the formula

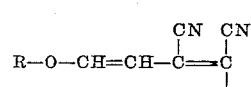

where R is aryl.

15. 4-benzyloxy-1,1,2-tricyano-1,3-butadiene.
16. 4-methoxy-1,1,2-tricyano-1,3-butadiene.
17. A 4 - hydrocarbylaryl - 1,1,2 - tricyano - 1,3 - butadiene having the formula $$R^3-Ar-\overset{R^1}{\underset{|}{C}}=\overset{R^2}{\underset{|}{C}}-\overset{CN}{\underset{|}{C}}=\overset{CN}{\underset{|}{C}}-CN$$

where Ar is arylene, $R^1$ and $R^2$ are selected from the group consisting of hydrogen and hydrocarbyl groups free of aliphatic carbon-to-carbon unsaturation, and $R^3$ is a hydrocarbyl group free of aliphatic carbon-to-carbon unsaturation.

18. A 4-aryl-1,1,2-tricyano-1,3-butadiene having the formula $$H-Ar-\overset{R^1}{\underset{|}{C}}=\overset{R^2}{\underset{|}{C}}-\overset{CN}{\underset{|}{C}}=\overset{CN}{\underset{|}{C}}-CN$$

where Ar is arylene and $R^1$ and $R^2$ are hydrocarbyl groups free of aliphatic carbon-to-carbon unsaturation.

19. A 4-aryl-1,1,2-tricyano-1,3-butadiene having the formula $$H-Ar-CH=CH-\overset{CN}{\underset{|}{C}}=\overset{CN}{\underset{|}{C}}-CN$$

where Ar is arylene.

20. 4-phenyl-1,1,2-tricyano-1,3-butadiene.

21. Process for preparing a 4-hydrocarbyloxy-1,1,2-tricyano-1,3-butadiene having the formula $$R-O-CH=CH-\overset{CN}{\underset{|}{C}}=\overset{CN}{\underset{|}{C}}-CN$$

which comprises contacting and reacting, at a temperature within the range of 20 to 200° C., tricyanovinylchloride with a 1-hydrocarbyloxy-2-hydrogenethylene having the formula $$R-O-CH=CH_2$$

where R is a hydrocarbyl group of 1 to 20 carbon atoms free of aliphatic carbon-to-carbon unsaturation.

22. Process for preparing a 4-alkoxy-1,1,2-tricyano-1,3-butadiene having the formula $$R-O-CH=CH-\overset{CN}{\underset{|}{C}}=\overset{CN}{\underset{|}{C}}-CN$$

which comprises contacting and reacting, at a temperature within the range of 20 to 200° C., tricyanovinyl chloride with a 1-hydrocarbyloxy-2-hydrogenethylene having the formula $$R-O-CH=CH_2$$

where R is alkyl of 1 to 20 carbon atoms.

References Cited in the file of this patent
UNITED STATES PATENTS 2,540,736      Kalb et al. _____ Feb. 6, 1951